Dec. 31, 1957  C. C. HALL  2,817,906
LINEAR MEASURING DEVICE
Filed Nov. 12, 1954  2 Sheets-Sheet 1
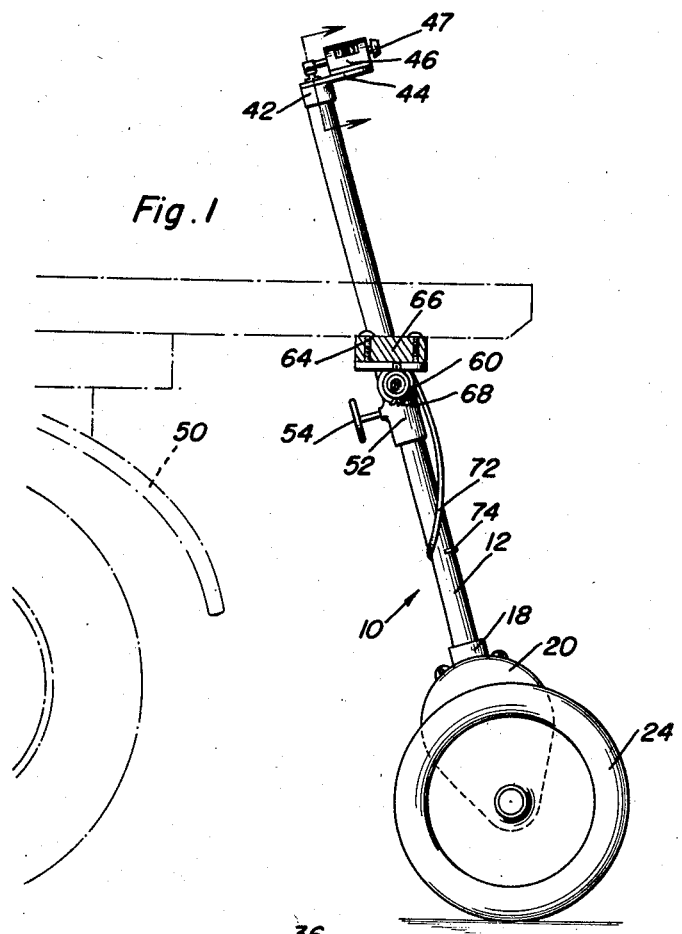
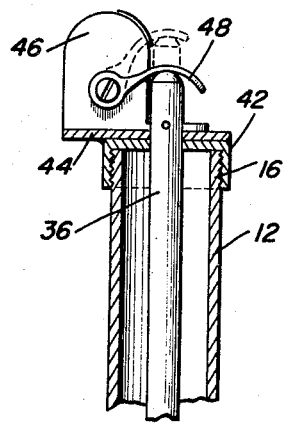
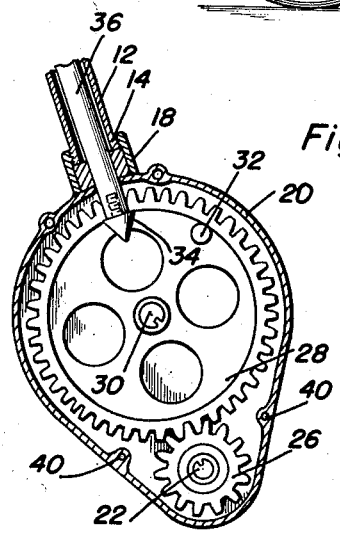
Clifford C. Hall
INVENTOR.

Dec. 31, 1957  C. C. HALL  2,817,906
LINEAR MEASURING DEVICE
Filed Nov. 12, 1954  2 Sheets-Sheet 2
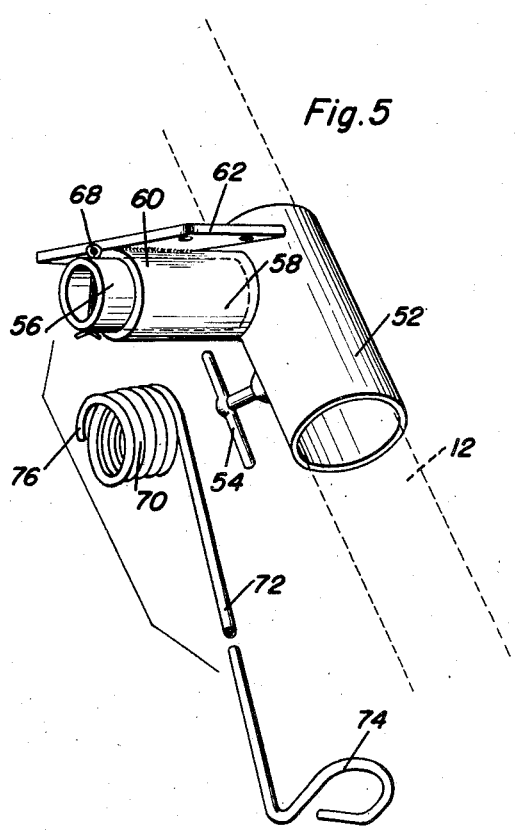
Clifford C. Hall
INVENTOR.

United States Patent Office 2,817,906
Patented Dec. 31, 1957

2,817,906

LINEAR MEASURING DEVICE

Clifford C. Hall, Liberal, Kans.

Application November 12, 1954, Serial No. 468,288

2 Claims. (Cl. 33—141)

This invention relates to a surveying instrument, and more particularly to a topographical measuring device.

The primary object of the present invention resides in the provision of a topographical measuring device which is adapted to be attached to almost any type of vehicle for the purpose of making accurate linear measurements over most surfaces.

One of the particular features of the invention resides in the novel mounting for the topographical measurer which enables the accurate measurement of various surfaces, including rough plowed ground as well as paved surfaces.

Still another object of the invention lies in the provision of means for obtaining linear measurements during the traversing of a vehicle over various types of terrain and in which measurements are made in simple units for easy conversion and tabulation.

Still further objects and features of this invention reside in the provision of a topographical measuring device that is positive in its operation, strong, durable, simple in construction, and highly efficient in operation.

These, together with the various ancillary objects and features of this invention which will become apparent as the following description proceeds, are attained by this topographical measuring device, a preferred embodiment of which has been illustrated in the accompanying drawings, by way of example only, wherein:

Figure 1 is a side elevational view of the invention shown operatively installed on a vehicle with a portion of the vehicle being shown in section adjacent the location where the topographical measuring device is attached;

Figure 2 is a rear elevational view of the invention;

Figure 3 is an enlarged sectional detail view as taken along the plane of line 3—3 in Figure 1, illustrating the means for actuating the counter;

Figure 4 is an enlarged sectional detail view as taken along the plane of line 4—4 in Figure 2, illustrating the construction of the means for actuating the rod which actuates the counter; and Figure 5 is an exploded perspective view, illustrating the means utilized for pivotally attaching the measuring device to a vehicle.

With continuing reference to the accompanying drawings wherein like reference numerals designate similar parts throughout the various views, reference numeral 10 generally designates the topographical measuring device comprising the present invention which includes a tubular member 12 which has a threaded lower end 14, see Figure 4, as well as a threaded upper end 16, as in Figure 3.

At the lower end of the tube 14, there is an extruded portion 18 of a casing 20 which is threadedly secured on the threaded end 14 of the tubular member 12. The casing has journaled therein a suitable shaft 22 on which a wheel 24 which may be provided with a pneumatic tire or the like is secured.

Keyed to the shaft 22 is a drive gear 26 which engages a driven gear 28 keyed to a shaft 30 also journaled in the casing 20. On the gear 30, there is a detent or pawl 32 which is adapted to engage the conical cam end 34 of a rod 36 extending upwardly within the tubular member 12 with the conical cam end 34 thereof extending into the casing 20.

The casing 20 may be provided with a face plate 38 for ready access to the interior of the casing, and fasteners, such as screws 40, can be utilized to secure the face plate to the casing 20.

At the upper end of the tubular member 12, there is threadedly secured an extrusion which is internally threaded and which is designated by reference numeral 42 to which is secured a mounting plate 44 on which a counter 46 of conventional construction is secured. The counter 46 may be provided with a reset control knob 47.

The counter 46 is actuated by a trigger arm 48 which is engaged by the upper end of the rod 36 and which when actuated will add a digit representing a unit of distance to the counter 46.

Hence, as the pawl 32 engages the cam end 34 of the rod 36, it will lift the rod 36 to actuate the counter 46. Since the wheel 24 and the gears 26 and 28 are calibrated to represent a unit of distance, such as a rod or 16½ feet, which is preferably used for acreage measurements, each of the proper number of rotations of the wheel 24 will cause the rod 36 to become agitated to add another digit to the counter 46 representing an additional rod traversed.

The tubular member 12 is adjustably mounted on a vehicle, indicated at 50, by means of a slide 52 which is adjustably clamped to the tubular member 12 by means of a T-shaped threaded clamping member 54 threadedly engaged in the slide 52 and having a pointed end adapted to engage and grasp the tubular member 12 to hold the slide 52 in an adjusted position.

Attached to the slide 52 is a cylindrical member 56 which extends outwardly therefrom at substantially right angles thereto and which is rotatably received within a sleeve 58 forming a portion of a bracket 60 including a mounting plate 62 which, by means of bolts, as at 64, is attached to a beam of other suitable structure 66 attached to or forming a part of the vehicle 50. A cotter key or like fastener 68 is mounted in the cylindrical member 56 to prevent disengagement of the cylindrical member 56 from the sleeve 58.

The tubular member 12 is vertically adjusted by operation of the slide 52 so that the pivotal member 52 extends angularly inclined downwardly and rearwardly. A spring including a coil portion 70 as well as a limb portion 72 having an end 74 adapted to be engaged about the tubular member 12 is positioned on the sleeve 58 with the coil portion 70 having its end 76 secured to the bracket 60 in such manner as to continuously urge the tubular member 12 into a normal position, thereby urging the wheel 24 into engagement with the terrain. The spring 72 therefore forms means for maintaining the accuracy of the device against displacement when the topographical measuring device is traveling over rough terrain.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A topographical measuring device comprising a tubular member, a tubular slide adjustably secured on said tubular member having a cylindrical member attached normal thereto, a bracket for attachment to a vehicle and including an attaching plate having a sleeve secured thereto, said sleeve being rotatable on said cylindrical member forming means for pivotally mounting said tubular member on a vehicle, said tubular member being inclined in a rearwardly and downwardly extending position, resilent means urging said tubular member towards a vertical position, a counter at the top of said tubular member, a shaft at the other end of said tubular member, said shaft having a ground engaging wheel mounted thereon, a rod for actuating said counter in said tubular member, and means associated with said shaft for reciprocating said rod.

2. A topographical measuring device comprising a tubular member, a tubular slide adjustably secured on said tubular member having a cylindrical member attached normal thereto, a bracket for attachment to a vehicle and including an attaching plate having a sleeve secured thereto, said sleeve being rotatable on said cylindrical member forming means for pivotally mounting said tubular member on a vehicle, said tubular member being inclined in a rearwardly and downwardly extending position, a spring positioned about said sleeve and being secured to said tubular member and said bracket urging said tubular member towards a vertical position, a counter at the top of said tubular member, a shaft at the other end of said tubular member, said shaft having a ground engaging wheel mounted thereon, a rod for actuating said counter in said tubular member, a drive gear driven by said shaft, a driven gear engaging said drive gear and having a pawl thereon, said rod having a conical cam-shaped end, said pawl engaging said cam-shaped end to lift said rod for reciprocating said rod to actuate said counter.

References Cited in the file of this patent

UNITED STATES PATENTS

| | | |
|---|---|---|
| 745,726 | Hathaway | Dec. 1, 1903 |
| 782,106 | Burton | Feb. 7, 1905 |
| 2,595,021 | Swanson | Apr. 29, 1952 |